No. 852,049.　　　　　　　　　　　　　　　PATENTED APR. 30, 1907.
J. G. ASH.
POST AND MOLDING MACHINE.
APPLICATION FILED AUG. 7, 1906.
2 SHEETS—SHEET 1.
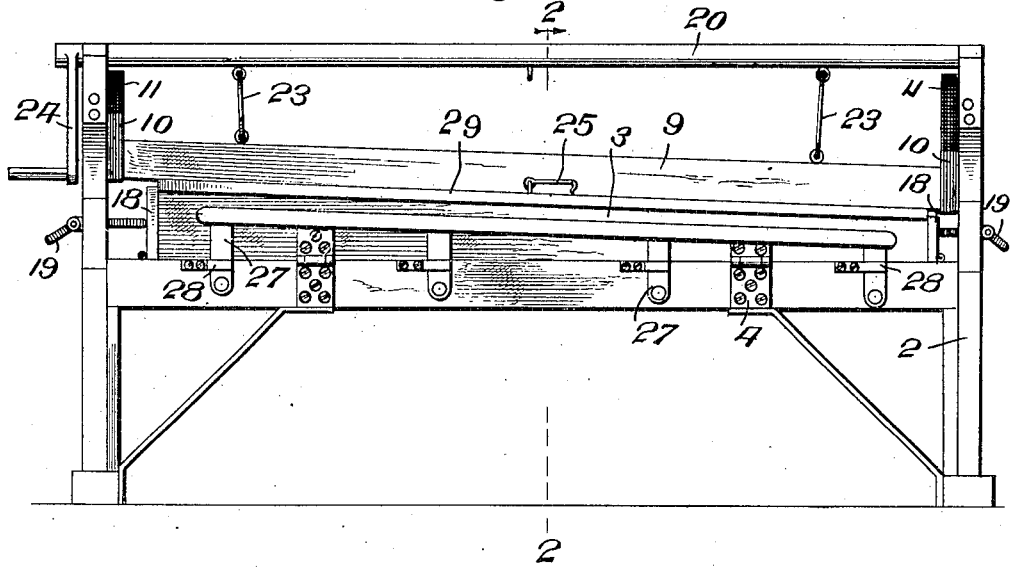
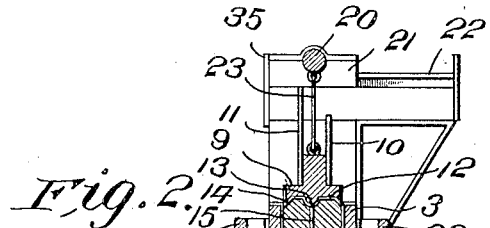
Witnesses
Inventor
J. G. Ash
By W. J. FitzGerald & Co.
Attorneys No. 852,049. PATENTED APR. 30, 1907.
J. G. ASH.
POST AND MOLDING MACHINE.
APPLICATION FILED AUG. 7, 1906.
2 SHEETS—SHEET 2.
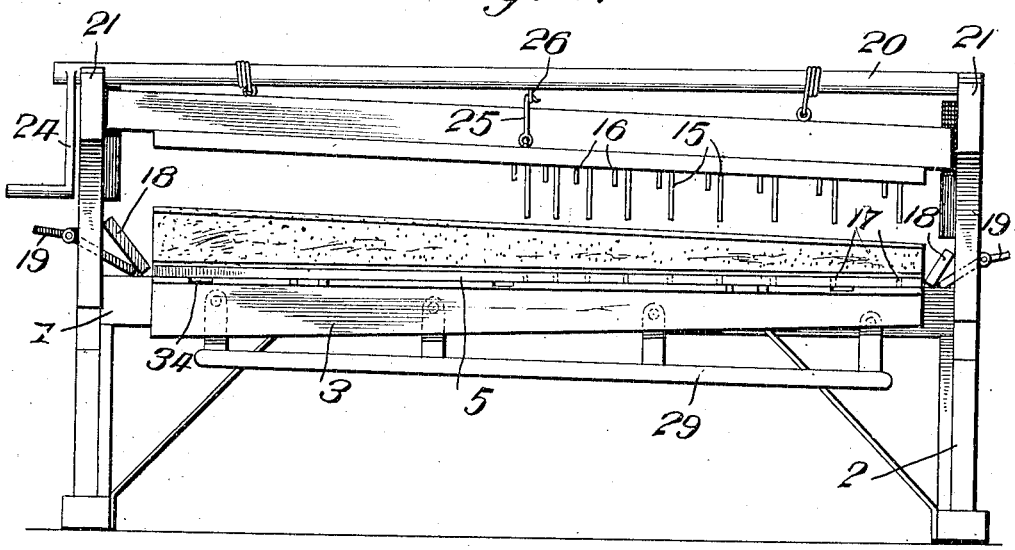
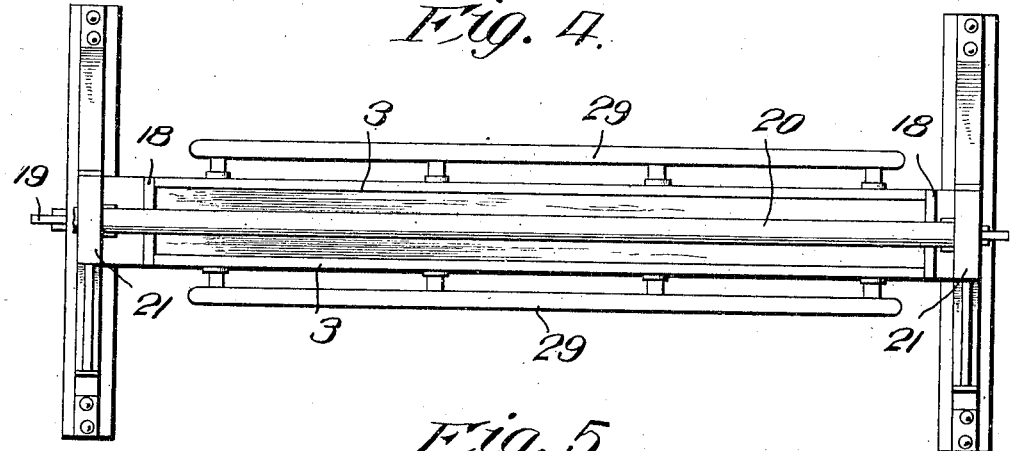
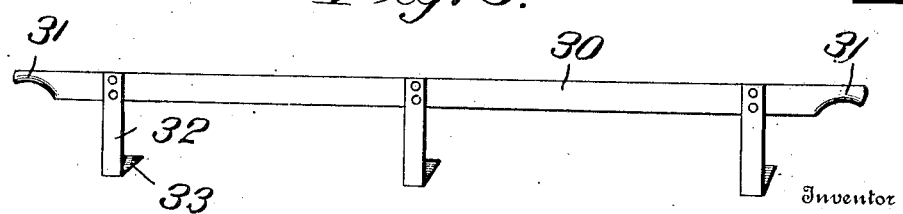

UNITED STATES PATENT OFFICE.

JAMES G. ASH, OF MANCHESTER, IOWA.

POST AND MOLDING-MACHINE.

No. 852,049.   Specification of Letters Patent.   Patented April 30, 1907.

Application filed August 7, 1906. Serial No. 329,614.

*To all whom it may concern:*

Be it known that I, JAMES G. ASH, a citizen of the United States, residing at Manchester, in the county of Delaware and State of Iowa, have invented certain new and useful Improvements in Posts and Molding-Machines; and I do hereby declare the following to be a full, clear, and exact description of the invention, such as will enable others skilled in the art to which it appertains to make and use the same.

My invention relates to new and useful improvements in molding machines and more particularly to that class adapted to be used in forming fence posts or the like of plastic material and my object is to provide a device of this class whereby the post can be quickly and economically molded and readily removed from the mold.

A further object is to provide means for disposing parts of the machine out of alinement with the mold so that the plastic material can be readily disposed therein.

A further object is to provide means for disposing openings through the post to receive wire securing devices.

A still further object is to provide suitable clamping means for the parts of the mold whereby it may be readily assembled together to receive the plastic material or disposed apart to remove the finished post.

Other objects and advantages will be hereinafter referred to and more particularly pointed out in the claims.

In the accompanying drawings which are made a part of this application, Figure 1 is a side elevation of my improved mold showing the same in position to produce a finished post. Fig. 2 is a sectional view thereof as seen from line 2—2 Fig. 1. Fig. 3 is a side elevation of the device showing the parts of the mold separated and the post in position to be removed from the mold. Fig. 4 is a top plan view of the mold in its assembled position, and, Fig. 5 is a perspective view of a device used in removing the post from the mold.

Referring to the drawings in which similar reference numerals designate corresponding parts throughout the several views, 1 indicates the bed of my improved mold which is supported at each end by suitable standards 2.

Secured to the upper face of the bed 1 and at each edge thereof are side rails 3, said rails being secured to the bed by means of hinges 4 or the like, the side rails forming two walls of the mold, the lower wall of the mold being formed by placing a pallet 5 upon the upper face of the bed 1. The inner faces of the side rails 3 are preferably covered with sheets of metal or the like 6 and the surfaces of these sheets may be constructed in various shapes to produce varied surfaces upon the post 7.

In the construction shown the lower corners 8 of the metallic strip 6 are directed inwardly to form an angular corner on the post while the remainder of the surface of the strips is left plain or as above stated said surfaces may be roughened or otherwise distorted to produce various curvatures of the outer surface of the post. Disposed between the upper ends of the standards 2 is a plunger 9, the extended ends of which are adapted to travel between the guides 10 and 11 on the inner faces of the standards, the lower face of the plunger 9 being provided with a covering of sheet metal or the like 12, which is similarly constructed to the sheets of metal 6 and in this instance the central portion of the plunger and metal covering therefor are provided with a rib 13 so that a longitudinal groove will be formed in one face of the post. The outer edges of the sheet 12 are disposed at an angle as at 14 to form angular corners on the post to correspond with the angular corners produced by the inwardly directed portions 8 of the metallic strips 6.

In constructing a post of plastic material it is expedient to provide the post at intervals with openings through which are disposed suitable wire retaining members and to this end I provide a portion of the lower face of the plunger 9 with a plurality of suitably spaced rods 15 and 16, the rods 15 being of sufficient length to pass entirely through the post and into openings 17 in the pallet 5 thereby directing the openings entirely through the post, while the rods 16 are of less length and enter the post but a short distance, the object being to provide means for inserting a substantially L-shaped staple (not shown) into engagement with the post and over suitable line wires, one portion of the staple being passed entirely through the post, while the opposite or shorter end thereof is directed into the opening made by the rod 16, the openings made by the rods 15 and 16 being disposed centrally in the post and in alinement with the groove formed by the rib 13.

The end of the mold is formed by plates 18 which are hinged to the upper surface of the bed 1 and are directed into and held in a vertical position and against the ends of the side rails 3 by means of locking arms 19, said arms being pivotally secured to the standards 2 and having their inner ends directed through openings in the standards and into engagement with the outer faces of the plates 18, the outer ends of the locking arms forming handles by which means the locking arms may be moved into or out of engagement with the plates.

The plunger 9 is vertically movable in the guides 10 and 11 and is operated by means of a shaft 20 which is rotatably mounted upon blocks 21, slidably mounted upon suitable tracks 22 at the upper ends of the standards 2, the plunger being secured to the shaft 20 by cables or the like 23 so that when the shaft 20 is rotated in one direction by means of a crank 24, the cables will wind around the shaft and elevate the plunger 9, the plunger being held in its elevated position by means of a hook or the like 25 carried by the plunger, being disposed into engagement with a keeper 26 on the shaft 20.

The side rails 3 are held in a vertical position by means of a plurality of bars 27, said bars being pivoted at their lower ends to the sides of the bed 1 and being adapted to be engaged by suitable straps 28 rigidly secured to the sides of the bed 1, the upper ends of the bars being pivotally secured to a rail 29 so that all of the bars upon one side of the bed will be swung upon their pivot points in unison.

In operation, the pallet 5 is disposed on the upper face of the bed 1 after which the side rails 3 are disposed in a vertical position and the bars 27 directed into engagement with the straps 28 which securely hold the side rails in their elevated position. The plates are then directed into a vertical position and the locking arms 19 directed into engagement therewith, after which the plastic material is placed in the mold formed by the side rails and end plates and after the mold has been properly filled the plunger 9 is lowered until the lower face thereof is flush with the upper edges of the side rails 3, this operation directing the rods 15 and 16 into the plastic material forming the post. When the molding operation has been completed the shaft 20 is rotated and the plunger again elevated and after the hook 25 has been directed into engagement with the keeper 26 the blocks 21 are directed outwardly upon the tracks 22 thereby disposing the plunger and shaft from over the mold, the guides 10 being made shorter than the guides 11 so that the ends of the plunger will freely move thereover.

By this construction it will be seen that ready access to the mold can be had without the plunger and shaft interfering with the removal of the post. The rails 29 are then moved longitudinally thereby swinging the bars 27 on their pivot points and directing the same out of engagement with the straps 28, the rotation of the straps upon their pivot points being continued until the rail and bars are entirely out of the path of the side rails 3, when the side rails are lowered. The locking arms 19 are then released from end plates and said plates moved away from the end of the molded post, the post being then left free to be removed from its position upon the bed. In removing the post after it has been molded the pallet 5 is removed with the post thereby enabling me to handle the post when in a green state without breaking the same and in accomplishing this result I employ a carrying device comprising an elongated bar 30 having handle sections 31 at each end thereof and provided with a plurality of depending standards 32, the lower ends of which are provided with right angled extensions 33, said extensions being adapted to take under the pallet 5 so that when the extensions are properly inserted under the pallet the post may be readily removed from position upon the bed and carried to any suitable point and placed away to dry. In order to properly dispose the extensions 33 below the pallet 5 when in position upon the bed 1, a plurality of channels 34 are directed across the upper face of the bed 1, in which are adapted to take the extensions 33 when being disposed below the pallet and post thereon.

When a post has been molded and removed from the bed, another pallet is disposed in position and the side rails and end plates assembled together and filled with suitable plastic material. The plunger is then directed over the mold by moving the blocks 21 inwardly upon the track 22 until said blocks engage suitable stops 35 on the standards. The hook 25 is then disengaged from the keeper and the plunger 9 lowered by rotating the shaft 20, the above operation being repeated until the required number of posts have been molded.

It will now be seen that I have provided an economical device for molding articles from plastic material and one that can be quickly and easily operated and it will further be seen that I have provided suitable means for removing the molded article while in a green or soft state.

What I claim is.

1. In a mold for plastic material, the combination with standards having a bed secured there between; of side rails hingedly secured to said bed, a plurality of bars pivotally secured to the side of said bed, means to connect the upper ends of said bars and cause them to swing upon their pivot points in unison, straps secured to said bed and adapted to engage said bars whereby the side rails will be held in a vertical position, plates pivoted to said bed, and at the ends of said side rails, said plates and side rails forming a mold and locking arms pivotally secured to said standards to hold said plates in a vertical position said locking arms having handles at their outer ends.

2. A mold of the class described, the combination with standards, a bed between said standards and suitable mold forming devices secured to said bed; of a plunger vertically movable between said standards, guides for said plunger, one of said guides being shorter than the other, a shaft rotatably mounted above said plunger, means to yieldingly secure said plunger to the shaft, a track at the upper end of each of said standards, a block slidably mounted upon each track, said blocks carrying said shaft whereby when the plunger is elevated to its full height it may be disposed from over the mold by directing the blocks rearwardly upon the tracks.

3. In a mold of the class described the combination with a suitable bed and supporting standards therefor; of side rails hingedly secured to said bed, bars pivoted at their lower ends to said bed, a rail pivotally connected with the upper ends of said bars whereby said bars will be caused to move in unison, straps secured to said bed and adapted to engage said bars, and hold the same vertically whereby when the bars are disposed into engagement with the straps the side rails will be held rigidly in a vertical position.

In testimony whereof I have signed my name to this specification in the presence of two subscribing witnesses.

JAMES G. ASH.

Witnesses:
R. B. DAVIS,
T. WILSON.